United States Patent
Nakamura

(10) Patent No.: US 10,158,429 B2
(45) Date of Patent: Dec. 18, 2018

(54) OPTICAL RECEIVING APPARATUS

(71) Applicant: NEC Corporation, Tokyo (JP)

(72) Inventor: Kohei Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/561,138

(22) PCT Filed: Mar. 18, 2016

(86) PCT No.: PCT/JP2016/001586
§ 371 (c)(1),
(2) Date: Sep. 25, 2017

(87) PCT Pub. No.: WO2016/157800
PCT Pub. Date: Oct. 6, 2016

(65) Prior Publication Data
US 2018/0048394 A1    Feb. 15, 2018

(30) Foreign Application Priority Data

Mar. 27, 2015    (JP) .................. 2015-065681

(51) Int. Cl.
*H04J 14/02* (2006.01)
*H04B 10/66* (2013.01)
*H04L 25/03* (2006.01)
*H04B 10/67* (2013.01)
*H04B 10/69* (2013.01)

(52) U.S. Cl.
CPC ............ *H04B 10/66* (2013.01); *H04B 10/67* (2013.01); *H04J 14/02* (2013.01); *H04L 25/03006* (2013.01); *H04B 10/675* (2013.01); *H04B 10/6971* (2013.01)

(58) Field of Classification Search
CPC ...... H04B 10/66; H04B 10/67; H04B 10/675; H04B 10/676; H04B 10/6971; H04B 10/6972; H04J 14/02; H04L 25/03006
USPC .......................................... 398/79, 207, 208
See application file for complete search history.

(56) References Cited

U.S. PATENT DOCUMENTS

| 6,785,446 B1 | 8/2004 | Chandrasekhar et al. |
| 2006/0067695 A1 | 3/2006 | Doerr et al. |

FOREIGN PATENT DOCUMENTS

| EP | 1460788 A1 | 9/2004 |
| EP | 1643667 A1 | 4/2006 |
| JP | H11-72756 A | 3/1999 |
| JP | 2000-068931 A | 3/2000 |

(Continued)

OTHER PUBLICATIONS

International Search Report corresponding to PCT/JP2016/001586 dated May 24, 2016 (2 pages).

*Primary Examiner* — M. R. Sedighian
(74) *Attorney, Agent, or Firm* — Wilmer Cutler Pickering Hale and Dorr LLP

(57) ABSTRACT

In order to suppress the deterioration of receiving characteristics, even in cases where a receiving band of an optical receiver is insufficient with respect to a bit rate of a received signal, an optical receiving apparatus 10 according to the present invention comprises an optical equalizer 20 that provides a light spectrum shaping for spreading an effective band width of an inputted optical signal and an optical receiver 30 that electrically converts and receives the optical signal provided with the light spectrum shaping.

11 Claims, 8 Drawing Sheets

WDM OPTICAL RECEIVING APPARATUS 100D

(56) References Cited

FOREIGN PATENT DOCUMENTS

| | | | | |
|---|---|---|---|---|
| JP | 2004-289831 A | | 10/2004 | |
| JP | 2004289831 A | * | 10/2004 | ............... G02B 6/26 |
| JP | 2005-039554 A | | 2/2005 | |
| JP | 2006-106740 A | | 4/2006 | |
| JP | 2012-103215 A | | 5/2012 | |
| JP | 2013-045079 A | | 3/2013 | |
| JP | 2013045079 A | * | 3/2013 | ............... G02B 5/20 |
| JP | 2013-106328 A | | 5/2013 | |

* cited by examiner

OPTICAL RECEIVING APPARATUS 100 100

FIG. 3
(a) BEFORE PASSING
    OPTICAL EQUALIZER 200
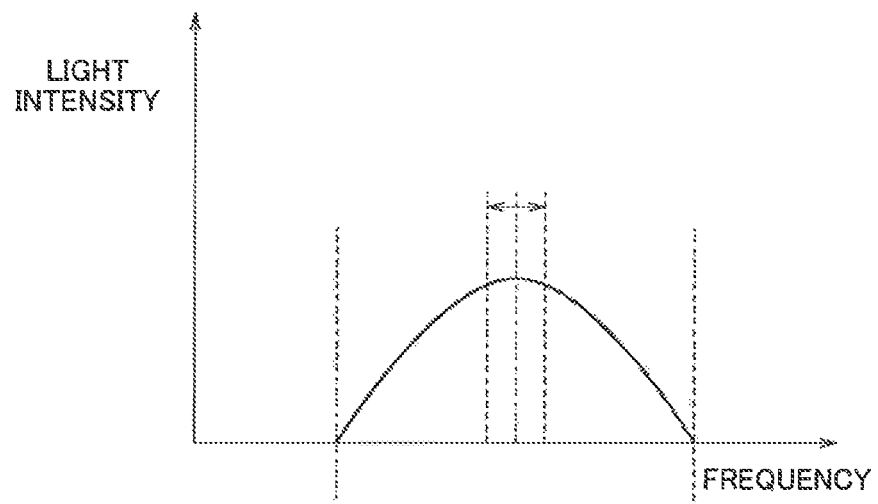
(b) AFTER PASSING
    OPTICAL EQUALIZER 200
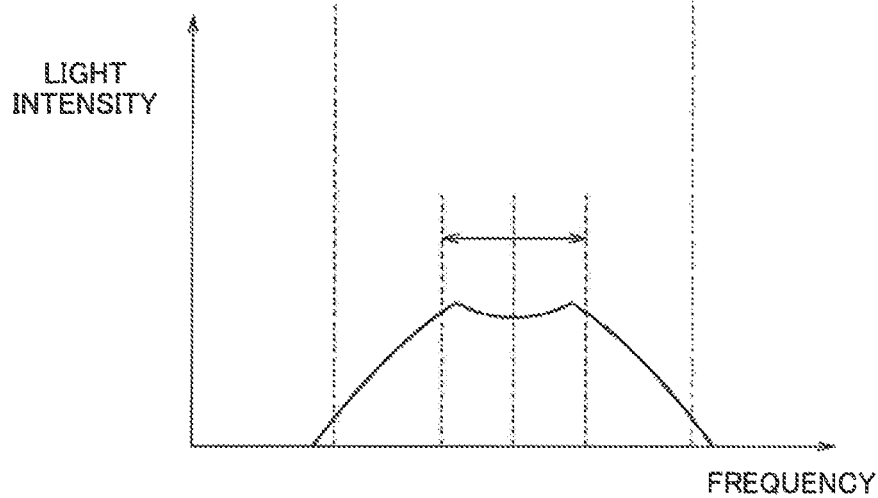

FIG. 6
(a)
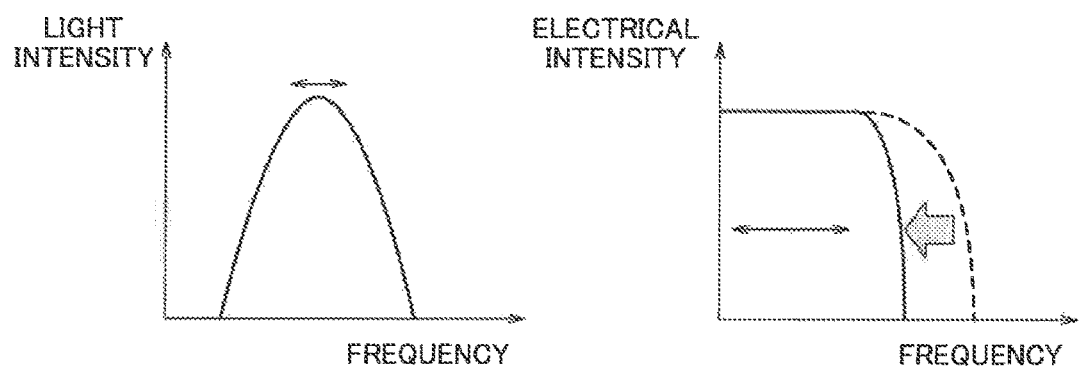
(b)
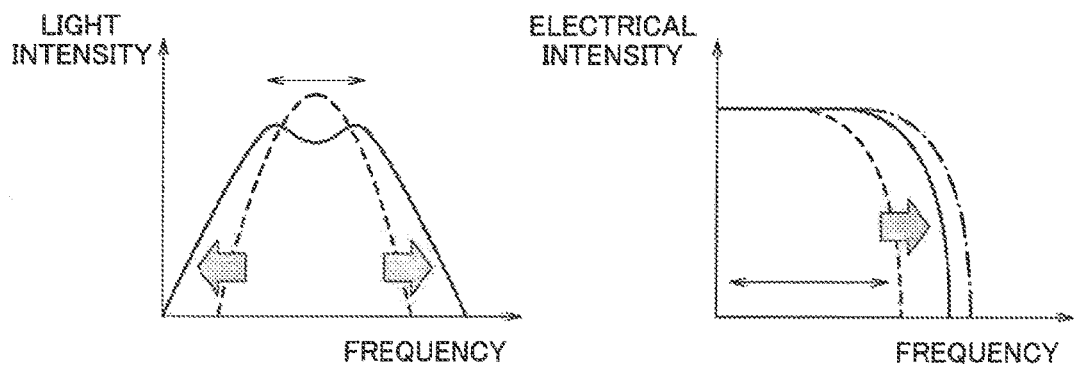

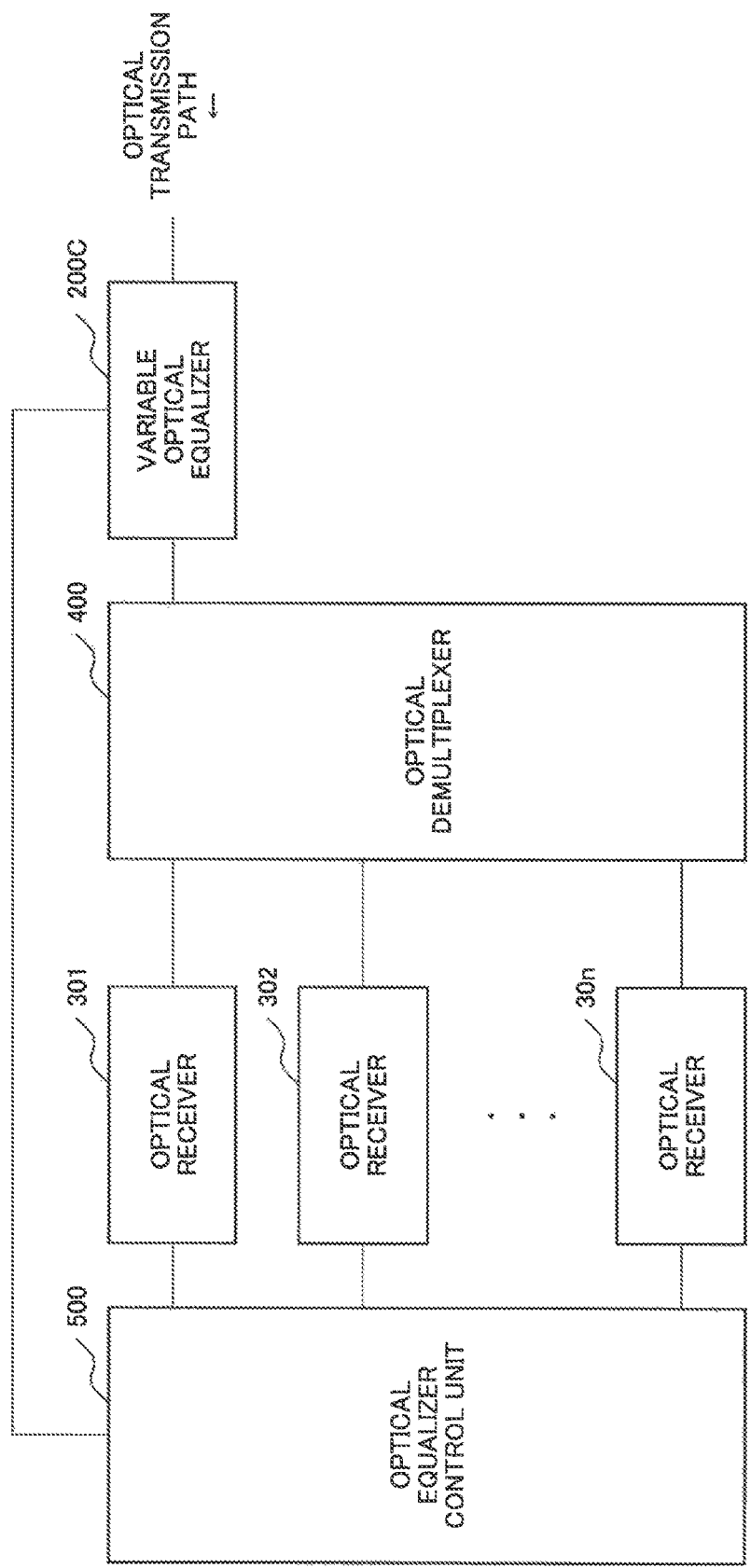

OPTICAL RECEIVING APPARATUS

CROSS-REFERENCE TO RELATED APPLICATIONS

This application is a national stage application of International Application No. PCT/JP2016/001586 entitled "Optical Receiving Apparatus" filed on Mar. 18, 2016, which claims priority to Japanese Patent Application No. 2015-065681 filed on Mar. 27, 2015, the disclosures of which are hereby incorporated by reference in their entirety.

TECHNICAL FIELD

The present invention relates to an optical receiving apparatus, and, more particularly, to an optical receiving apparatus including a reception circuit to perform photo/electric conversion of a received optical signal and perform reception processing.

BACKGROUND ART

Along with increase of communications traffic these days, construction of a large capacity system is required for an optical transmission system. As an optical transmission system that can cope with such capacity increase, there are various multiplex systems of such as wavelength multiplexing, time division multiplexing and optical polarization division multiplexing, for example. Then, an optical receiving apparatus that is used for such optical transmission systems is disclosed in patent literature 1, for example.

A receiver of patent literature 1 can take out a desired channel stably from a received signal by extracting a carrier and one optical signal in the short wavelength side or in the long wavelength side from the received optical signal, and suppressing phase components in the short wavelength side and the long wavelength side from counteracting each other at the time of photoelectric conversion.

Here, in addition to that, various technologies to improve the reception characteristics by performing some correction to a received optical signal have been also proposed.

For example, in patent literature 2, there is disclosed a technology to improve optical transmission quality by adjusting the property of an edge band part and the property in the center region part in a super channel signal based on system information such as the network topology of an optical transmission system.

Also, in patent literature 3, there is disclosed a technology to improve transfer characteristics deterioration due to an error between an optical signal wavelength and the transmission center wavelength of an optical multiplexer/demultiplexer using an optical filter for spectral shaping, thereby improving tolerance to a wavelength error.

Furthermore, there is disclosed in patent literature 4 a technology to reduce influence of waveform deterioration by performing phase-modulation in such a way that opposite optical frequency shifts are caused in the first half and the second half of an optical pulse.

CITATION LIST

Patent Literature

[PTL 1] Japanese Patent Application Laid-Open No. 2012-103215
[PTL 2] Japanese Patent Application Laid-Open No. 2013-106328
[PTL 3] Japanese Patent Application Laid-Open No. 2000-68931
[PTL 4] Japanese Patent Application Laid-Open No. 2005-39554

SUMMARY OF INVENTION

Technical Problem

On the other hand, along with bit rate improvement of a received signal in capacity expansion of systems, a bandwidth that is needed as the receiving bandwidth of an optical receiving apparatus is also becoming wider. A lack of a receiving bandwidth in an optical receiving apparatus causes distortion of an electric spectrum after photo/electric conversion, resulting in deterioration of the reception characteristics.

Even if the technologies of patent literature 1-4 mentioned above can improve quality of a received signal itself, they cannot achieve improvement when there is originally a lack of a receiving band in the side of an optical receiving apparatus, resulting in remarkable degradation of the reception characteristics.

The present invention has been made in view of the above-mentioned problem, and its object is to provide an optical receiving apparatus that can suppress degradation of reception characteristics even when there is a lack of a receiving band of an optical receiver relative to the bit rate of a received signal.

Solution to Problem

In order to achieve the above-mentioned object, an optical receiving apparatus according to the present invention includes: an optical equalizer to perform light spectrum shaping for expanding an effective band width of an inputted optical signal; and an optical receiver to perform electric conversion of the optical signal that has undergone the light spectrum shaping and to perform reception processing.

An optical receiving method of the present invention includes: performing light spectrum shaping for expanding an effective band width of an inputted optical signal; and performing electric conversion of the optical signal that has undergone the light spectrum shaping and performing reception processing.

Advantageous Effects of Invention

According to the aspects of the present invention mentioned above, degradation of reception characteristics can be suppressed even when there is a lack of a receiving band in an optical receiver relative to the bit rate of a received signal.

BRIEF DESCRIPTION OF DRAWINGS

FIG. 3 is a diagram illustrating (a) an example of the optical spectrum of an optical signal inputted to the optical equalizer 200 according to the first example embodiment, and (b) an example of the optical spectrum of an optical signal after passing through the optical equalizer 200.

FIG. 6 is a diagram illustrating an optical spectrum and an electric spectrum when an optical signal having a bit rate larger than the receiving band of the optical receiver 300 is (a) inputted to the optical receiver 300 just as it is, and (b) inputted to the optical receiver 300 after passing through the optical equalizer 200.

FIG. 9 is a block diagram of a WDM optical receiving apparatus 100D according to a modification of the second example embodiment.

DESCRIPTION OF EMBODIMENTS

First Example Embodiment

Figure 1:
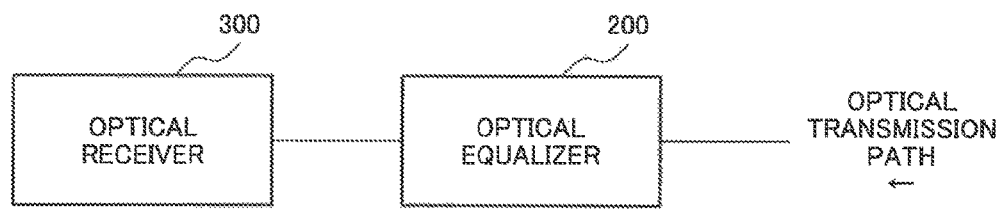
FIG. 1 is a block diagram of an optical receiving apparatus 100 according to a first example embodiment.

The first example embodiment of the present invention will be described. A block diagram of an optical receiving apparatus according to this example embodiment is illustrated in FIG. 1. In FIG. 1, the optical receiving apparatus 100 includes the optical equalizer 200 and the optical receiver 300.

Figure 2:
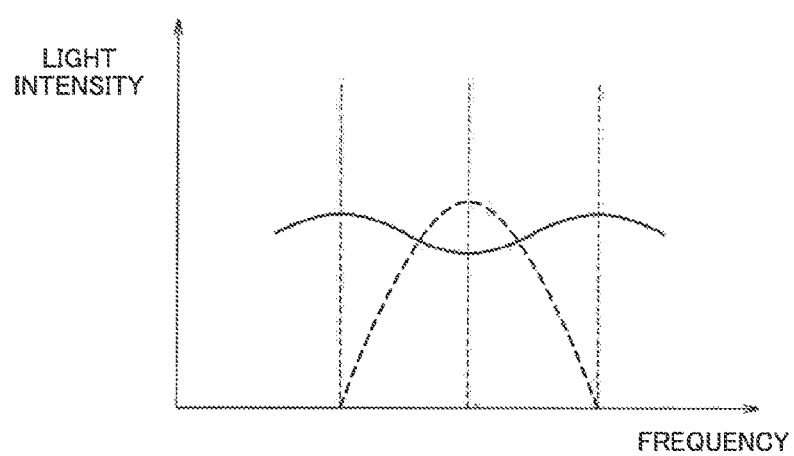
FIG. 2 is a diagram indicating an example of the filter shape of an optical equalizer 200 according to the first example embodiment.

The optical equalizer 200 has a predetermined filter shape and performs light spectrum shaping to an inputted optical signal to expand an effective band width. An example of a filter shape of the optical equalizer 200 according to this example embodiment is illustrated in FIG. 2. Meanwhile, an optical spectrum of an optical signal before passing through the optical equalizer 200 is illustrated in FIG. 2 by a dotted line.

As illustrated in FIG. 2, the optical equalizer 200 has a filter shape of a trigonometric function type that has a center frequency identical with the carrier signal frequency of an inputted optical signal and has a period corresponding to the bandwidth of the inputted optical signal, and has an amplitude that makes optical power of the peak part region (in FIG. 2, center region) of the light intensity of the inputted optical signal be dispersed to the end areas. By passing the optical equalizer 200 having the filter shape illustrated in FIG. 2, the optical power of the peak part of the light intensity of an optical signal is dispersed to the optical signal in end areas, the edges of the optical spectrum rise, and the effective band width of the optical signal is expanded. Meanwhile, description will be made later about the effect of dispersing the optical power of the light intensity peak part to the end areas.

An example of an optical spectrum of an optical signal before and after passing the optical equalizer 200 illustrated in FIG. 2 is illustrated in FIG. 3. FIG. 3(a) is an optical spectrum of an optical signal inputted from an optical transmission path to the optical equalizer 200, and FIG. 3(b) is an optical spectrum of the optical signal after passing the optical equalizer 200. Here, the arrows of FIG. 3 indicate an effective band width of the optical signal.

As can be understood from FIG. 2 and FIG. 3, an optical signal having an optical spectrum of the Gaussian distribution type illustrated in FIG. 3(a) comes to have the center region of the optical spectrum having become hollow and the both edges having been expanded as illustrated in FIG. 3(b) by passing the optical equalizer 200 having the filter shape of FIG. 2. Here, the effective bandwidth of an optical signal is defined by a bandwidth at positions where a light intensity is lowered by a predetermined value from the maximum value of the light intensity. Accordingly, by making the center region of the optical spectrum become hollow, the edges of the optical spectrum rise and the effective band width of the optical signal is expanded.

The optical receiver 300 performs photo/electric conversion to the optical signal which has been inputted from the optical equalizer 200 and has undergone light spectrum shaping, and performs reception processing. By applying spectrum shaping in the optical stage to an optical signal that is to be inputted to the optical receiver 300, the effective bandwidth of the optical signal is expanded. As a result, the optical spectrum of the optical signal comes to be within the receiving band of the optical receiver 300, for example, and the reception characteristics at the time of photo/electric conversion in the optical receiver 300 is improved.

Figure 4:
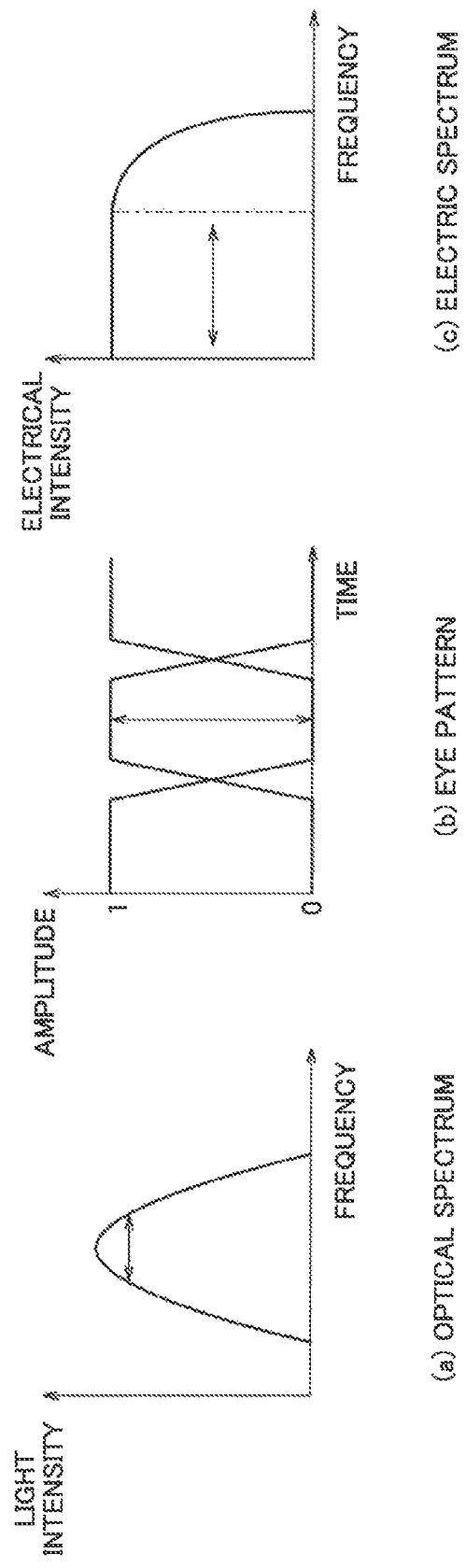
FIG. 4 is a diagram illustrating relation between the effective band width of an optical signal, Eye Opening and an electric signal band.

Next, the effect of making the center region of an optical spectrum become hollow in the optical equalizer 200 will be described using FIG. 4. FIG. 4(a) is the optical spectrum of an optical signal, FIG. 4(b) an eye pattern, and FIG. 4(c) an electric spectrum when photo/electric conversion of the optical signal of FIG. 4(a) has been performed. The arrows in FIGS. 4(a), (b) and (c) respectively indicate an effective band width, an eye pattern and an electric signal band of the optical signal.

As mentioned above, in FIG. 4(a), the effective band width of an optical signal is defined by a bandwidth at positions where a light intensity is lowered by a predetermined value from the maximum value of the light intensity. The effective band width of an optical signal is proportional to the eye opening (EO: Eye Opening) in the eye pattern of FIG. 4(b). Then, according to the size of the Eye Opening, an electric signal band when having performed photo/electric conversion illustrated in FIG. 4(c) is determined. Accordingly, when the light intensity of the center region of an optical signal is made to become hollow and the effective bandwidth is made large by making the optical signal pass the optical equalizer 200 as illustrated in FIG. 3, Eye Opening becomes large and, as a result, an electric signal band is expanded.

Figure 5:
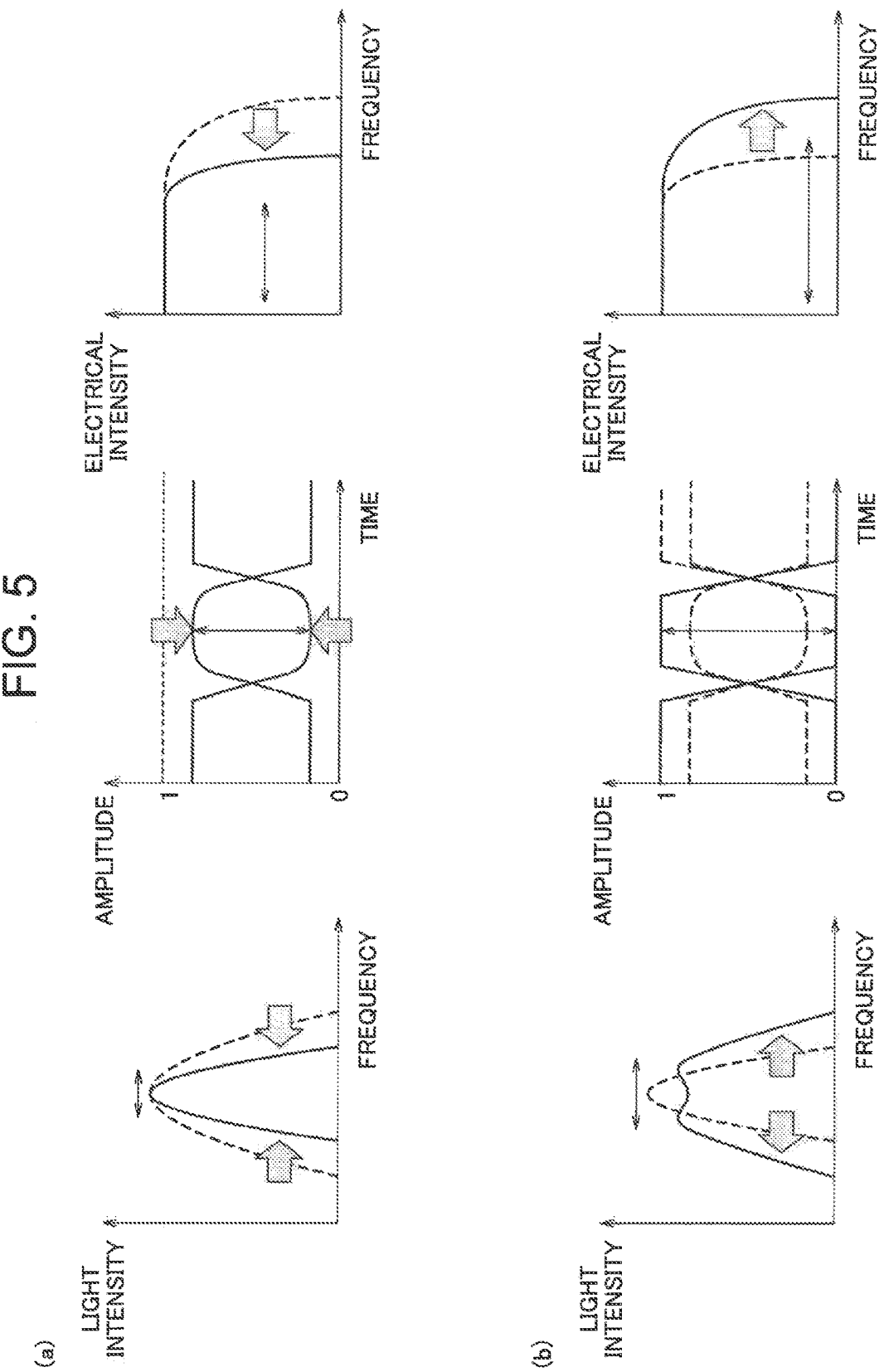
FIG. 5 is a diagram illustrating an example of an optical spectrum, eye pattern and an electric spectrum when an optical signal whose optical spectrum has been narrowed is (a) inputted to an optical receiver 300 just as it is, and (b) inputted to the optical receiver 300 after passing through the optical equalizer 200.

Description will be made using a specific example. First, a case when an optical spectrum is narrowed in an optical transmission path and the like will be described using FIG. 5. FIG. 5(a) indicates an optical spectrum of an optical signal, eye pattern and an electric spectrum after photo/electric conversion when inputting the optical signal whose optical spectrum has been narrowed to the optical receiver 300 just as it is. FIG. 5(b) indicates an optical spectrum of an optical signal, eye pattern and an electric spectrum after photo/electric conversion when inputting the optical signal whose optical spectrum has been narrowed to the optical receiver 300 after making it pass the optical equalizer 200. Meanwhile, in FIG. 5(a), an optical spectrum, eye pattern and electricity spectrum when the optical spectrum is not narrowed are indicated by dotted lines. On the other hand, in FIG. 5(b), the optical spectrum, the eye pattern and the electricity spectrum of FIG. 5(a) are indicated by dotted lines.

As illustrated in FIG. 5(a), when light spectrum shaping is not performed, Eye Opening becomes small by the optical spectrum having been narrowed. In this case, the electric signal band becomes small by the electric spectrum after photo/electric conversion becoming dull, resulting in degradation of the reception characteristics.

In contrast, as illustrated in FIG. 5(b), when light spectrum shaping to make the center region of an optical signal become hollow and expand the edges by making the optical signal pass the optical equalizer 200 is performed, Eye Opening is improved by the effective bandwidth of the optical signal being expanded. As a result, the dullness of the electric spectrum after photo/electric conversion is reduced, and an electric signal band is improved.

Next, a case in which there is a lack of a receiving band of the optical receiver 300 relative to the bit rate of an optical signal will be described using FIG. 6. FIG. 6(a) illustrates an optical spectrum of an optical signal having a high bit rate exceeding the receiving band of the optical receiver 300 and an electric spectrum after photo/electric conversion when inputting the optical signal to the optical receiver 300 just as it is; and FIG. 6(b) illustrates an optical spectrum of an optical signal and an electric spectrum after photo/electric conversion when inputting the optical signal having a high bit rate exceeding the receiving band of the optical receiver 300 to the optical receiver 300 after making it pass the optical equalizer 200. Meanwhile, in FIG. 6(a), an electric spectrum in a case where the receiving band of the optical receiver 300 is enough is indicated by a dotted line. On the other hand, in FIG. 6(b), an optical spectrum and an electric spectrum of FIG. 6(a) are indicated by dotted lines and an electric spectrum when the receiving band of the optical receiver 300 is enough is indicated by a dash-and-dot line.

In FIG. 6(a), when light spectrum shaping is not performed, only an electric signal band indicated by the solid line can be obtained because of a lack of a receiving band of the optical receiver 300, although, essentially, the electric signal band indicated by the dotted line should be obtained in a signal of a high bit rate beyond the receiving band of the optical receiver 300. In this case, an electric spectrum after photo/electric conversion will be a dull shape, and the reception characteristics degrades.

In contrast, in FIG. 6(b), when light spectrum shaping in which an optical signal is made to pass the optical equalizer 200, and the center region of the optical signal is made to become hollow, and the edge parts are expanded is performed, the band restriction of the optical receiver 300 is compensated by the expansion of the effective band width of the optical signal, and the dullness of the electric spectrum after photo/electric conversion is reduced.

As above, the optical receiving apparatus 100 according to this example embodiment expands the effective band width by performing spectrum shaping to a signal in an optical stage in the optical equalizer 200, and expands the receiving band (electric signal band) in the optical receiver 300 equivalently. Accordingly, it is possible to suppress the reception characteristics from degrading even when an optical spectrum has been narrowed in an optical transmission path and the like, or even when there is a lack of a receiving band of the optical receiver 300 relative to the bit rate of an optical signal.

Here, in this example embodiment, it has been made such that the filter shape of the optical equalizer 200 is formed to be of a triangle function type that has a center frequency identical with the carrier signal frequency of an inputted optical signal and has a period corresponding to the bandwidth of the inputted optical signal, and has an amplitude that makes optical power of the peak part region of the light intensity of the inputted optical signal be dispersed to the end areas, but it is not limited to this. The filter shape of the optical equalizer 200 can be set appropriately according to an optical spectrum and actual transmission characteristics of an optical signal after passing an optical transmission path.

Second Example Embodiment

The second example embodiment will be described. Although the optical receiving apparatus 100 having one optical equalizer 200 and one optical receiver 300 has been described in the first example embodiment, a plurality of pieces of optical equalizer 200 and optical receiver 300 can be arranged. In this example embodiment, a plurality of optical equalizers and a plurality of optical receivers are arranged in a Wavelength Division Multiplexing (WDM) optical receiving apparatus to receive an optical signal to which wavelength division multiplexing has been performed.

Figure 7:
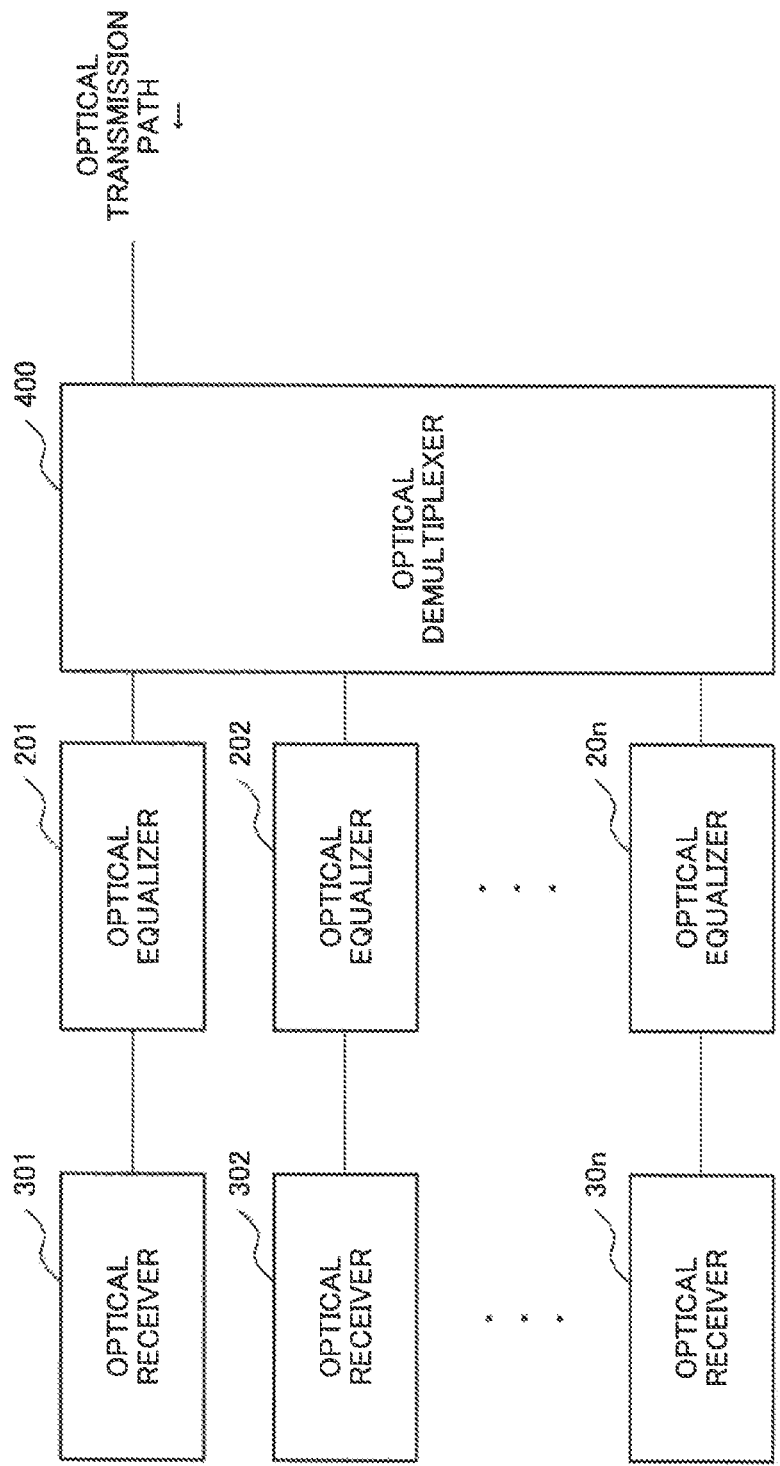
FIG. 7 is a block diagram of a WDM optical receiving apparatus 100B according to a second example embodiment.

A block diagram of a WDM optical receiving apparatus according to this example embodiment is illustrated in FIG. 7. The WDM optical receiving apparatus 100B of FIG. 7 includes n optical equalizers 201-20n, n optical receivers 301-30n, and an optical demultiplexer 400.

A wavelength-multiplexed light signal inputted from an optical transmission path is separated spectrally for each wavelength in the optical demultiplexer 400, and is inputted to the optical equalizers 201-20n, respectively. Each of the optical equalizers 201-20n has a filter shape of a triangle function type that has a center frequency identical with the carrier signal frequency of an inputted optical signal and has a period corresponding to the bandwidth of the inputted optical signal, and has an amplitude that makes optical power of the peak part region of the light intensity of the inputted optical signal be dispersed to the end areas. Each of the optical equalizers 201-20n performs light spectrum shaping to an inputted optical signal according to a wavelength, and outputs the signals to the optical receivers 301-30n, respectively. Each of the optical receivers 301-30n performs photo/electric conversion to an optical signal that has been inputted and to which light spectrum shaping has been applied, and performs reception processing.

By performing light spectrum shaping according to a wavelength in the n optical equalizers 201-20n, respectively, and expanding a receiving band (electric signal band) in the optical receivers 301-30n equivalently, high reception performance can be maintained even when an optical spectrum is narrowed in an optical transmission path and the like or when there is a lack of a receiving band of the optical receivers 301-30n at the bit rate of the optical signal.

Figure 8:
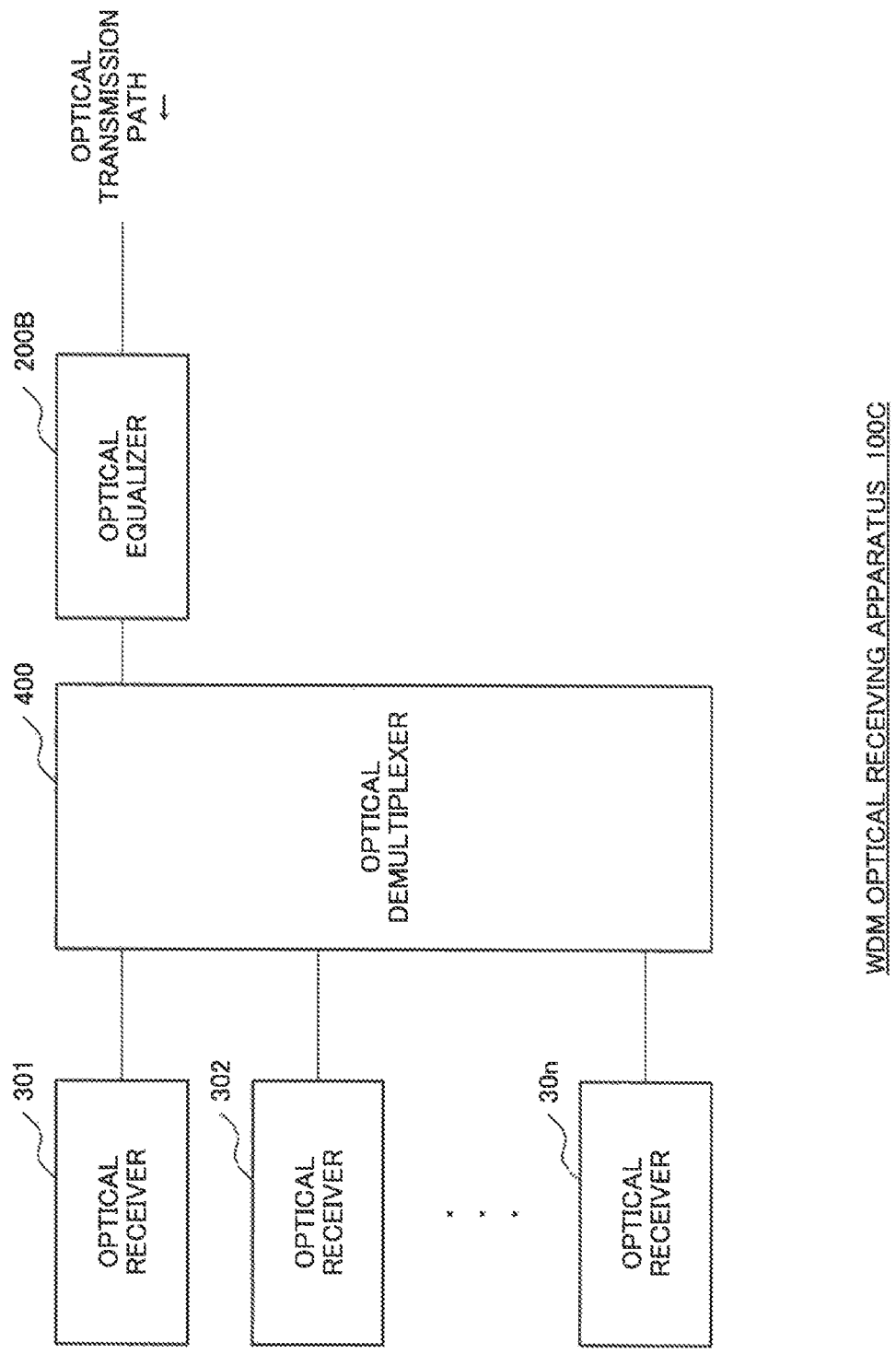
FIG. 8 is a block diagram of a different WDM optical receiving apparatus 100C according to the second example embodiment.

Meanwhile, in a WDM optical receiving apparatus, the number of optical equalizers can be made to be one. A block diagram of this case's WDM optical receiving apparatus is illustrated in FIG. 8. The WDM optical receiving apparatus 100C of FIG. 8 includes one optical equalizer 200B, the optical receivers 301-30n and the optical demultiplexer 400.

The optical equalizer 200B has a filter shape of a triangle function type that has a center frequency identical with the center wavelength of a wavelength-multiplexed light signal inputted to the WDM optical receiving apparatus 100C and has a period corresponding to the bandwidth of the wavelength-multiplexed light signal, and has an amplitude that makes the optical power of the peak part region of the light intensity of the inputted wavelength-multiplexed light signal be dispersed to the end areas The wavelength-multiplexed light signal inputted to the WDM optical receiving apparatus 100C is separated spectrally for each wavelength in the optical demultiplexer 400 after having undergone light spectrum shaping in the optical equalizer 200B, and inputted to the optical receivers 301-30n, respectively. Each of the optical receivers 301-30n performs photo/electric conversion to an inputted optical signal to which light spectrum shaping has been applied and performs reception processing.

Also in the WDM optical receiving apparatus 100C constituted as above, by performing light spectrum shaping to make the peak part area of the light intensity of a wavelength-multiplexed light signal become hollow in the optical equalizer 200B and expand the hem parts, high reception performance can be maintained even when an optical spectrum is narrowed in an optical transmission path and the like or when there is a lack of a receiving band of the optical receivers 301-30n at the bit rate of the optical signal. Accordingly, high reception performance can be maintained even when an optical spectrum is narrowed in an optical transmission path and the like or when there is a lack of a receiving band of the optical receivers 301-30n relative to the bit rate of an optical signal.

Modification of the Second Example Embodiment

Modification of the second example embodiment will be described. A block diagram of a WDM optical receiving apparatus according to this example embodiment is illustrated in FIG. 9. The WDM optical receiving apparatus 100D of FIG. 9 includes a variable optical equalizer 200C, the optical receivers 301-30n, the optical demultiplexer 400, and an optical equalizer control unit 500.

The variable optical equalizer 200C is an optical equalizer that can change its filter shape flexibly according to a wavelength change, a wavelength grid change or the like of a wavelength-multiplexed light signal. In the variable optical equalizer 200C according to this example embodiment, the depth (amplitude) and the wavelength (period) of a filter shape are set most suitably by control from the optical equalizer control unit 500. The variable optical equalizer 200C for which its filter shape has been set most suitably by control from the optical equalizer control unit 500 applies light spectrum shaping according to the filter shape to a wavelength-multiplexed light signal inputted to the WDM optical receiving apparatus 100D, and outputs the resulting signal to the optical demultiplexer 400.

The optical demultiplexer 400 separates spectrally the inputted wavelength-multiplexed light signal to which the light spectrum shaping has been applied into n pieces according to a wavelength, and outputs the light signals having been generated by being separated spectrally into n pieces to the corresponding optical receivers 301-30n, respectively. Each of the optical receivers 301-30n performs photo/electric conversion of an inputted optical signal, and performs reception processing.

The optical equalizer control unit 500 acquires an error count at the time of reception from the optical receivers 301-30n. The optical equalizer control unit 500 performs feedback control of the variable optical equalizer 200C in such a way that an acquired error count will be small.

The WDM optical receiving apparatus 100D constituted as above changes the filter shape of the variable optical equalizer 200C most suitably based on an error count acquired from the optical receivers 301-30n by the optical equalizer control unit 500, and, therefore, it can expand the effective band width of a wavelength-multiplexed signal most suitably, and can expand the receiving bands of the optical receivers 301-30n efficiently. As a result, an error count at the time of reception in the optical receivers 301-30n becomes small, and degradation of reception characteristics can be suppressed even when an optical spectrum is narrowed in an optical transmission path and the like or when there is a lack of a receiving band (electric signal band) of the optical receivers 301-30n relative to the bit rate of an optical signal.

Here, feedback control of the variable optical equalizer 200C in the optical equalizer control unit 500 can be also applied to the WDM optical receiving apparatus 100B of FIG. 7 described in the second example embodiment. In this case, in the WDM optical receiving apparatus 100B, the n optical equalizers 201-20n are replaced by n variable optical equalizers respectively, and the above-mentioned optical equalizer control unit is arranged in the subsequent stage of the n optical receivers 301-30n. Then, based on an error count acquired from the optical receivers 301-30n, the optical equalizer control unit performs feedback control of each of the n variable optical equalizers.

The present invention is not limited to the above-mentioned example embodiments, and even if there is a change in the design or the like within a range that does not deviate from the point of this invention, it is included in this invention.

This application claims priority based on Japanese application Japanese Patent Application No. 2015-065681 filed on Mar. 27, 2015, the disclosure of which is incorporated herein in its entirety.

REFERENCE SIGNS LIST

100 Optical receiving apparatus
100B, 100C and 100D WDM optical receiving apparatus
200, 201-20n and 200B Optical equalizer
200C Variable optical equalizer
300 and 301-30n Optical receiver
400 Optical demultiplexer
500 Optical equalizer control unit

The invention claimed is:

1. An optical receiving apparatus, comprising:
   an optical equalizer configured to perform light spectrum shaping for expanding an effective band width of an inputted optical signal;
   an optical receiver configured to perform electric conversion of the optical signal that has undergone the light spectrum shaping and perform reception processing;
   an optical demultiplexer configured to separate spectrally an inputted wavelength-multiplexed light signal into n pieces on wavelength-by-wavelength basis and output separated signals;
   n optical equalizers to which the optical signals separated into n spectrally are inputted, respectively; and
   n optical receivers arranged in a subsequent stage of the n optical equalizers, respectively, wherein
      the optical receiving apparatus further comprises an optical equalizer controller configured to obtain an error count at a time of reception from the n optical receivers, and control the n optical equalizers in such a way that an obtained error count becomes small, and
      the n optical equalizers perform light spectrum shaping based on control from the optical equalizer controller, respectively.

2. The optical receiving apparatus according to claim 1, wherein the optical equalizer has a filter shape of a triangle function type that has a center frequency identical with a carrier signal frequency of an inputted optical signal and has a period corresponding to a bandwidth of the inputted optical signal, and has an amplitude that makes optical power of a peak part region of light intensity of the inputted optical signal be dispersed to an end area.

3. The optical receiving apparatus according to claim 2, wherein the filter shape has an amplitude that makes optical power be dispersed in such a way that an optical spectrum of an inputted optical signal be within a receiving band of the optical receiver.

4. An optical receiving apparatus, comprising
an optical equalizer configured to perform light spectrum shaping for expanding an effective bandwidth of an inputted optical signal;
an optical receiver configured to perform electric conversion of the optical signal that has undergone the light spectrum shaping and perform reception processing, wherein
a wavelength-multiplexed light signal is inputted to the optical equalizer, and the optical equalizer performs the light spectrum shaping for expanding an effective bandwidth of the inputted wavelength-multiplexed light signal, and
the optical receiving apparatus further comprises:
an optical demultiplexer configured to separate spectrally the wavelength-multiplexed signal having undergone the light spectrum shaping into n pieces on wavelength-by-wavelength basis and outputs separated signals; and
n optical receivers configured to be arranged in a subsequent stage of the optical demultiplexer; and
an optical equalizer controller configured to make the optical equalizer perform light spectrum shaping based on control from the optical equalizer controller, obtain an error count at a time of reception from the n optical receivers, and control the optical equalizer in such a way that an acquired error count becomes small.

5. An optical receiving method, comprising:
performing light spectrum shaping for expanding an effective bandwidth of an inputted optical signal;
performing electric conversion of the optical signal that has undergone the light spectrum shaping and performing reception processing;
separating spectrally an inputted wavelength-multiplexed light signal into n pieces on wavelength-by-wavelength basis and outputting separated signals;
performing the light spectrum shaping to the optical signals separated into n pieces, respectively; and
performing the reception processing to the optical signals to which the light spectrum shaping has been performed, wherein
the light spectrum shaping is performed based on control from an optical equalizer controller, respectively, and
the optical equalizer controller is configured to obtain an error count at a time of the reception processing and control the light spectrum shaping in such a way that an obtained error count becomes small.

6. The optical receiving method according to claim 5, wherein the light spectrum shaping is carried out by a filter of a triangle function type having a center frequency identical with a carrier signal frequency of an inputted optical signal and has a period corresponding to a bandwidth of the inputted optical signal, and has an amplitude that makes optical power of a peak part region of a light intensity of the inputted optical signal be dispersed to an end area.

7. The optical receiving method according to claim 6, wherein the filter shape has an amplitude that makes optical power disperse in such a way that an optical spectrum of an inputted optical signal is within a receiving band of the reception processing.

8. The optical receiving apparatus according to claim 4, wherein the optical equalizer has a filter shape of a triangle function type that has a center frequency identical to a carrier signal frequency of an inputted optical signal and has a period corresponding to a bandwidth of the inputted optical signal, and has an amplitude that makes optical power of a peak part region of light intensity of the inputted optical signal be dispersed to an end area.

9. The optical receiving apparatus according to claim 8, wherein the filter shape has an amplitude that makes optical power be dispersed in such a way that an optical spectrum of the inputted optical signal is within a receiving band of the optical receiver.

10. The optical receiving apparatus according to claim 1, wherein an effective bandwidth of the optical signal is defined by a bandwidth at positions where a light intensity of the optical signal is lowered by a predetermined value from the maximum value of the light intensity of the optical signal.

11. The optical receiving apparatus according to claim 4, wherein an effective bandwidth of the optical signal is defined by a bandwidth at positions where a light intensity of the optical signal is lowered by a predetermined value from the maximum value of the light intensity of the optical signal.

* * * * *